(12) United States Patent
Chaudhari et al.

(10) Patent No.: US 6,751,590 B1
(45) Date of Patent: Jun. 15, 2004

(54) METHOD AND APPARATUS FOR PERFORMING PATTERN-SPECIFIC MAXIMUM LIKELIHOOD TRANSFORMATIONS FOR SPEAKER RECOGNITION

(75) Inventors: Upendra V. Chaudhari, Elmsford, NY (US); Ramesh Ambat Gopinath, Millwood, NY (US); Stephane Herman Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 09/592,205

(22) Filed: Jun. 13, 2000

(51) Int. Cl.$^7$ ............................................. G10L 17/00
(52) U.S. Cl. ...................................... 704/246; 704/250
(58) Field of Search ................................. 704/200, 231, 704/234, 243, 246, 244, 250

(56) References Cited

U.S. PATENT DOCUMENTS

| | | | |
|---|---|---|---|
| 5,864,810 A | * 1/1999 | Digalakis et al. | 704/255 |
| 5,995,927 A | * 11/1999 | Li | 704/246 |
| 6,112,175 A | * 8/2000 | Chengalvarayan | 704/256 |
| 6,151,574 A | * 11/2000 | Lee et al. | 704/256 |
| 6,263,309 B1 | * 7/2001 | Nguyen et al. | 704/239 |
| 6,343,267 B1 | * 1/2002 | Kuhn et al. | 704/222 |
| 6,470,314 B1 | * 10/2002 | Dharanipragada et al. | 704/231 |
| 6,502,070 B1 | * 12/2002 | Boies et al. | 704/224 |

OTHER PUBLICATIONS

R.A. Gopinath, "Maximum Likelihood Modeling with Gaussian Distributions For Classification," Proc. ICASSP '98, 4 pages, 1998.

M.J.F. Gales, "Semi–Tied Covariance Matrices," Proc. ICASSP '98, 4 pages, 1998.

L. Polymenakos et al., "Transcription ofBroadcast News—Some Recent Improvements to IBM's LVCSR System," Proc. ICASSP '98, 4 pages, 1998.

* cited by examiner

*Primary Examiner*—Daniel Abebe
(74) *Attorney, Agent, or Firm*—Thu Ann Dang; Ryan, Mason & Lewis, LLP

(57) ABSTRACT

The present invention uses acoustic feature transformations, referred to as pattern-specific maximum likelihood transformations (PSMLT), to model the voice print of speakers in either a text dependent or independent mode. Each transformation maximizes the likelihood, when restricting to diagonal models, of the speaker training data with respect to the resulting voice-print model in the new feature space. Speakers are recognized (i.e., identified, verified or classified) by appropriate comparison of the likelihood of the testing data in each transformed feature space and/or by directly comparing transformation matrices obtained during enrollment and testing. It is to be appreciated that the principle of pattern-specific maximum likelihood transformations can be extended to a large number of pattern matching problems and, in particular, to other biometrics besides speech.

48 Claims, 13 Drawing Sheets

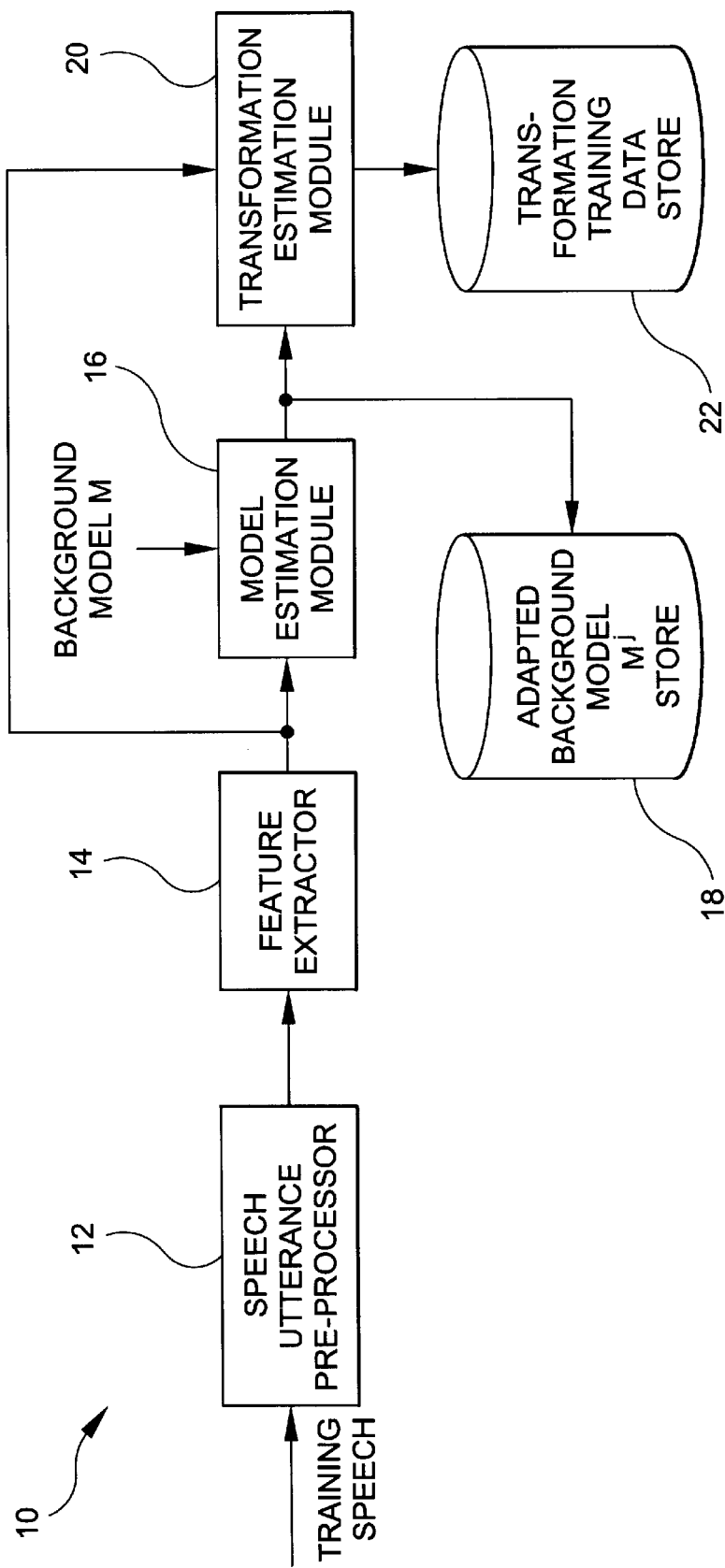

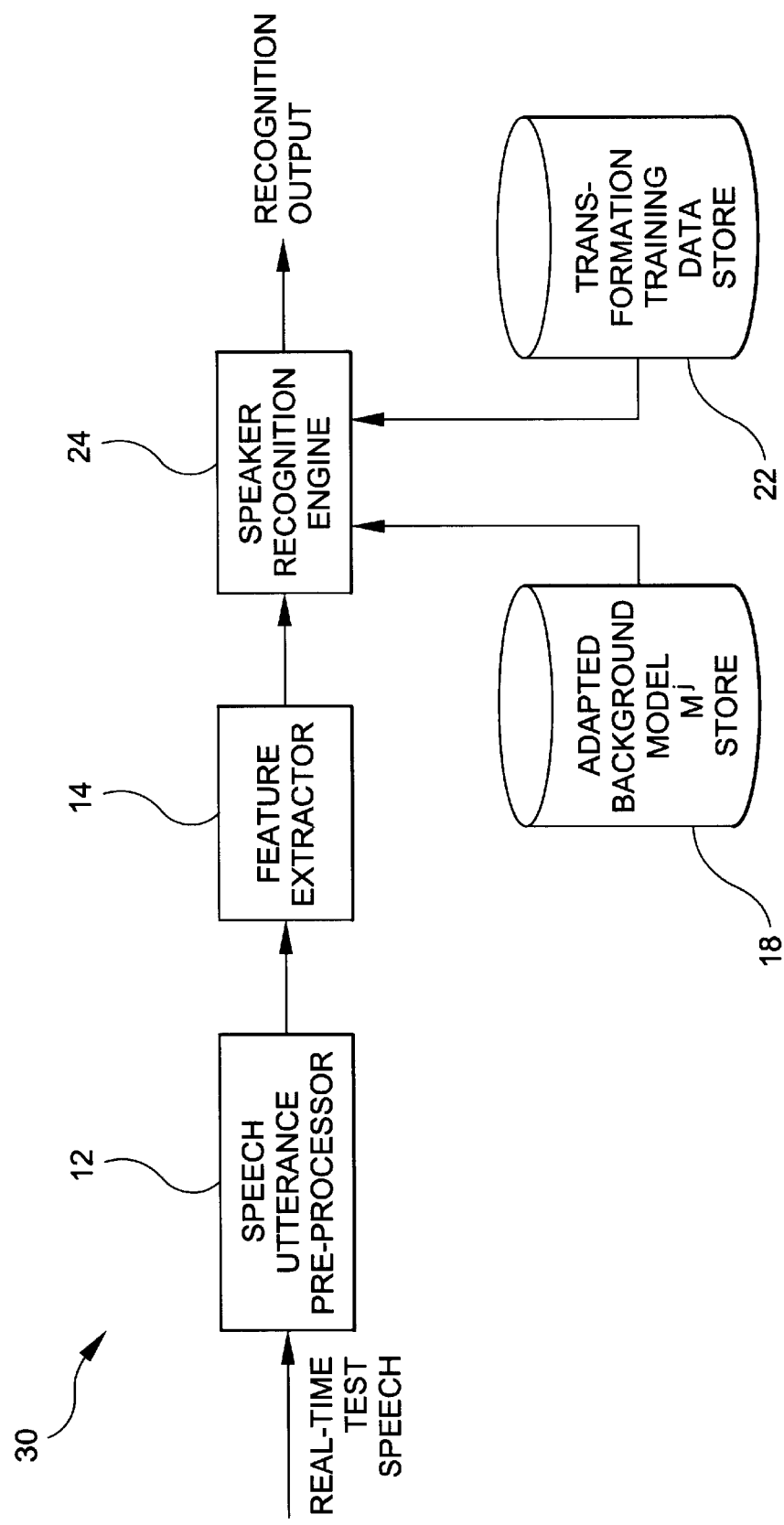

FIG.8 ROCS: TELEPHONY DATA (20 MALE/FEMALE, 30 SEC. TRAIN, 3-4 SEC. TEST)

FIG. 10  ROCS: TELEPHONY DATA (20 MALE/FEMALE, 7.5 SEC. TRAIN, 3-4 SEC. TEST)

FIG.11

7.5 sec.

| SYSTEM | FEMALE | MALE |
|---|---|---|
| BASELINE | 13% | 10.5% |
| TRANSFORM | 11.5% | 3.5% |

FIG.12

15 sec.

| SYSTEM | FEMALE | MALE |
|---|---|---|
| BASELINE | 4.5% | 3% |
| TRANSFORM | 2% | 0.5% |

FIG.13

30 sec.

| SYSTEM | FEMALE | MALE |
|---|---|---|
| BASELINE | 2% | 0.5% |
| TRANSFORM | 1% | 0% |

METHOD AND APPARATUS FOR PERFORMING PATTERN-SPECIFIC MAXIMUM LIKELIHOOD TRANSFORMATIONS FOR SPEAKER RECOGNITION

FIELD OF THE INVENTION

The present invention relates generally to speaker recognition systems and, more particularly, to methods and apparatus for performing pattern-specific maximum likelihood transformations in accordance with such speaker recognition systems.

BACKGROUND OF THE INVENTION

The goal of speaker recognition is to identify the properties of speech data, i.e., a sequence of data samples recorded over some transducer, that is hopefully uniquely modified by different speakers. Speaker recognition may be "text-dependent," where recognition depends on the accuracy of the actual words spoken, or "text-independent," where recognition does not depend on such accuracy. Typically, in text-independent speaker recognition, training data may be limited as in applications requiring on-line enrollment. For this case, diagonal Gaussian mixture models on $R^n$ (n-dimensional cepstral coefficients) form appropriate data models. Given test vectors, measures of match between a model and the data are given by the likelihood of the data with respect to the model. Efficiency is also gained by requiring the Gaussians to have diagonal covariances, which saves model storage space and allows efficient calculation of likelihood based discriminant functions. Effectively, this is a method of model selection based on the covariance structure in localized regions of the data space.

However, when modeling data with diagonal Gaussians it can be shown that the unmodified cepstral feature space is sub-optimal (see, e.g., R. A. Gopinath, "Maximum Likelihood Modeling with Gaussian Distributions For Classification," Proc. ICASSP'98, the disclosure of which is incorporated by reference herein), from the point of view of classification, in comparison to one which can be obtained by an invertible linear transformation. Techniques of feature and model space adaptation have been developed that allow information to be gained indirectly about covariance structure in localized regions of the data space, see, e.g., the above-referenced R. A. Gopinath article; and M. J. F. Gales, "Semi-Tied Covariance Matrices," Proc. ICASSP'98, the disclosure of which is incorporated by reference herein. The adaptation involves finding transformations of feature space regions that allow efficient and accurate modeling of data. Moreover, related (and even unrelated) regions can be tied together during the adaptation to overcome the lack of training data to some extent. Related techniques, such as MLLR (Maximum Likelihood Linear Regression) have been used for speaker and environment adaptive training of HMMs (Hidden Markov Models) in LVCSR (Large Vocabulary Continuous Speech Recognition) systems, see, e.g., L. Polymenakos, P. Olsen, D. Kanrvesky, R. A. Gopinath, P. S. Gopalakrishnan and S. Chen, "Transcription Of Broadcast News—Some Recent Improvements To IBM's LVCSR System," Proc. ICASSP'98, the disclosure of which is incorporated by reference herein.

It would be highly desirable to provide a classification technique which exploits the indirect information about covariance structure and its ability to be estimated with a small amount of data.

SUMMARY OF THE INVENTION

The present invention provides such a classification technique which exploits the indirect information about covariance structure, mentioned above, and its ability to be estimated with a small amount of data. In accordance with pattern-specific maximum likelihood transformation (PSMLT) methodologies of the invention, speaker models in the recognition system database are either characterized solely by the information evident in a feature space transformation or by this transformation in conjunction with a Gaussian mixture model. Discriminant functions are provided for both cases.

More specifically, the present invention provides acoustic feature transformations to model the voice print of speakers in either a text-dependent or text-independent mode. Each transformation maximizes the likelihood of the speaker training data with respect to the resulting voice-print model in the new feature space. Speakers are recognized (i.e., identified, verified or classified) by appropriate comparison of the likelihood of the testing data in each transformed feature space and/or by directly comparing transformation matrices obtained during enrollment and testing. The technique's effectiveness is illustrated in both verification and identification tasks for the telephony environment.

It is to be appreciated that, although presented in the particular case of speaker recognition, the principle of pattern-specific maximum likelihood transformations can be extended to a large number of pattern matching problems and, in particular, to other biometrics besides speech, e.g., face recognition and fingerprints.

Thus, in one aspect of the invention, a method for use in recognizing a provider of an input pattern-based signal may comprise the following steps. First, one or more feature vectors are extracted from an input pattern-based signal of an enrolling provider, the input pattern-based signal representing training data provided by the provider. A background model is then adapted using the one or more training feature vectors. Next, a training data transformation is generated using the adapted model and the one or more training feature vectors, the training data transformation and the adapted model comprising a pattern-specific representation of the enrolling provider of the input pattern-based signal. The steps of performing the training feature vector extraction, background model adaptation and training data transformation generation are preferably performed on one or more other enrolling providers of input pattern-based signals.

After such a training mode, recognition may be performed in the following manner. First, one or more feature vectors are extracted from an input pattern-based signal provided by a real-time provider, the input pattern-based signal representing test data provided by the provider. Scores are then computed for the one or more test feature vectors based on the respective training data transformations and adapted background models of at least a portion of the enrolled providers. Lastly, a recognition result is obtained based on the computed scores.

In another aspect of the invention, a method for use in recognizing a provider of an input pattern-based signal may comprise the following steps. First, one or more feature vectors are extracted from an input pattern-based signal of an enrolling provider, the input pattern-based signal representing training data provided by the provider. A training data transformation is then generated using an unadapted model and the one or more training feature vectors, the training data transformation comprising a pattern-specific representation of the enrolling provider of the input pattern-based signal. The steps of performing the training feature vector extraction and training data transformation generation are preferably performed on one or more other enrolling providers of input pattern-based signals.

After such a training mode, recognition may be performed in the following manner. First, one or more feature vectors are extracted from an input pattern-based signal provided by a real-time provider, the input pattern-based signal representing test data provided by the provider. A test data transformation is then generated using an unadapted model and the one or more test feature vectors, the test data transformation comprising a pattern-specific representation of the real-time provider of the input pattern-based signal. Next, scores are computed for the one or more test feature vectors by comparing the test data transformation with the respective training data transformations of at least a portion of the enrolled providers. Lastly, a recognition result is obtained based on the computed scores.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a block diagram of an illustrative speaker recognition system in a training mode according to one embodiment of the present invention;

FIG. 2 is a block diagram of an illustrative speaker recognition system in a real-time recognition mode according to one embodiment of the present invention;

FIGS. 8–13 are diagrams illustrating sample experimental results associated with comparisons between a baseline system and a pattern-specific maximum likelihood transformation based system according to one embodiment of the present invention.

DETAILED DESCRIPTION OF PREFERRED EMBODIMENTS

Figure 3A:
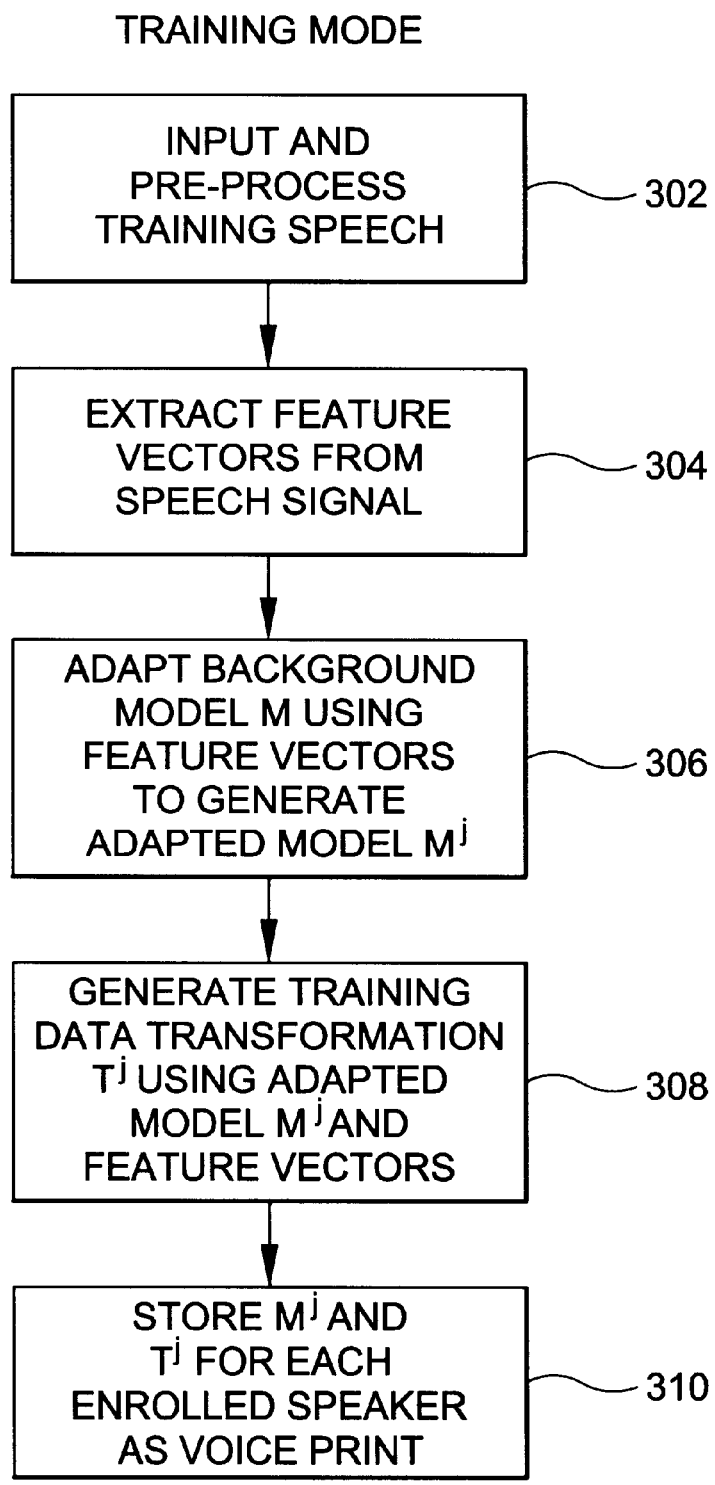
FIGS. 3A and 3B are flow diagrams of an illustrative pattern-specific maximum likelihood transformation based adaptation methodology according to one embodiment of the present invention.

The present invention will be explained below in the context of an illustrative speaker recognition system. However, it is to be understood that the present invention is not limited to this or any particular speaker recognition system. In fact, as mentioned above, the invention is not limited to speech applications. Rather, the invention is more generally applicable to any suitable pattern matching system in which it is desirable to realize increased matching performance via improved feature space transformation based adaptation techniques. By way of example only, generalized speaker recognition systems may be adapted to permit and/or perform feature space transformation in accordance with the invention.

For ease of reference, the remainder of the detailed description is divided into the following sections: (I) Basic Definitions and Standard Techniques; (II) Feature Space Adaptation; (III) Illustrative Embodiments; and (IV) Sample Experimental Results.

I. Basic Definitions and Standard Techniques

Before describing details and illustrative embodiments associated with the invention, some basic definitions and standard techniques associated with speaker recognition will now be discussed.

(i) Data: A sequence of vectors $\{X_i\}$ in $R^n$ is the basic representation of data. Each element of the sequence is subscripted by a discrete index which serves to define its ordering and is interpreted to contain the measurements describing some source at that time (or space) index.

Here, the basic data vector represents the Mel-frequency cepstral parameters for the indexed window frame. There are a number of operations applied to the basic signal to increase robustness to channel and noise variations. The two used in the illustrative embodiments are cepstral mean normalization and delta parameters.

(ii) Model: Define a global (background) speaker independent (SI) data model M as an n dimensional N component Gaussian mixture parameterized by $\{m_i, \Sigma_i, p_i\}$ where one has, respectively, the Maximum likelihood (ML) estimates of the mean vector, covariance matrix, and weight for each component. Corresponding to M, let $M_m = \{m_i\}$, a set of vectors that describe the volume of feature space of concern, $M_\Sigma = \{\Sigma_i\}$, the set of covariances, and $M_p = \{p_i\}$, the set of weights. The data used in order to train (i.e., obtain the ML parameters for) this model is assumed to consist of speech data from a large variety of speakers in all phonetic contexts. Given training data from source j, define $M^j$ to be an adaptation of the global M using the training data, parameterized by $\{m_i^j, \Sigma_i^j, p_i^j\}$. The following describes a standard technique, referred to a K-means, for adapting a codebook of vectors to some training data.

K-means: Given a set of codewords, in this case the set of means $M_m$, and training data X, the procedure alternates two steps. The first is a Euclidean distance based VQ (vector quantization) of X with respect to $M_m$. The second step is to re-estimate the mean for each codeword in $M_m$. Typically, a pre-determined number of iterations is chosen. If X is training data for some speaker j, then the resulting codewords constitute $M_m^j$. In the last iteration, one could as well compute $M_\Sigma^j$ and $M_p^j$ from the sample covariance and normalized count for each component. The result is denoted by $M^j$.

(iii) Discriminant Function: A basic problem in classification is the following. Given a sequence of data, determine which model (out of all trained models) matches best or determine that no model matches well. The basic discriminant is $P(X|M^j)$, the log likelihood. Let $P(x|M^j)$ be the probability of observing vector x with respect to $M^j$. If the observations are of a sequence of independent and identically distributed random vectors, then the probability of the observation, X, is:

$$P(X | M^j) = \prod_{x \in X} P(x | M^j) \qquad (1)$$

which is the likelihood. The log-likelihood function can then be written as:

$$\log P(X | M^j) = \sum_{x \in X} \log P(x | M^j) \qquad (2)$$

$$= \sum_{x \in X} \log \left[ \sum_{i=0}^{N-1} p_i^j p\left(x | m_i^j, \sum_i^j\right) \right] \qquad (3)$$

where, when using a Normal pdf (probability distribution function):

$$p\left(x | m_i^j, \sum_i^j\right) = \frac{1}{(2\pi)^{n/2} |\sum_i^j|^{1/2}} \times e^{-\frac{1}{2}(x-m_i^j)^t \sum_i^{j-1} (x-m_i^j)} \qquad (4)$$

Restricting to diagonal covariances, the component likelihoods become:

$$p\left(x | m_i^j, diag(\sum_i^j)\right) = \frac{1}{(2\pi)^{n/2} |diag(\sum_i^j)|^{1/2}} \times e^{-\frac{1}{2}(x-m_i^j)^t diag(\sum_i^j)^{-1}(x-m_i^j)} \qquad (5)$$

II. Feature Space Adaptation

Having used the training datarom a given speaker to adapt the speaker-independent global model, we know that in general some of the components will have extremely poor covariance estimates, and so, we restrict to diagonal covariances in order to increase robustness. However, the feature space being used may not be the best one in which to make this restriction. The second step in the adaptation procedure involves finding a unimodular feature space transformation (MLLT) that transforms the speaker model to one that is most consistent with diagonal covariance modeling of the data. In accordance with the invention, this transformation is referred to as a pattern specific maximum likelihood transformation (PSMLT). Additionally, for the experiments described herein, the transformation is derived globally over all Gaussian components. That the transformation is unimodular is important because this guarantees that, with respect to full covariance modeling of the data, the likelihood of data in the original and transformed spaces is equal. Otherwise, the likelihood scores for any model could be arbitrarily inflated or deflated, critically affecting model selection. PSMLT may be non-unimodular provided that appropriate Jacobians are introduced. Further, the assumption here is that it is not possible to obtain full covariance estimates for all components of the model implying that significant regions of the feature space would lack discriminatory power. Even though there is no advantage to using the transformation when full covariance models are used, when diagonal models are used, the advantage comes from leveraging the data corresponding to components where good estimates are possible to adapt the components with little or no data.

(i) Transformed Discriminant Function 1

In accordance with the invention, we let T represent a unimodular linear transformation with transpose $T^t$. Given a set of vectors X in $R^n$, let $X_T$ represent the set $\{Tx: x \in X\}$. Let $M_T$ represent the PSMLT-transformed model $\{Tm_i, T\Sigma_i T^t, p_i\}$. In a PSMLT T-transformed space, the likelihood becomes:

$$\log P(X_T | M_T^j) = \sum_{x \in X_T} \log \left[ \sum_{i=0}^{N-1} p\left(x | Tm_i^j, T\sum_i^j T^t\right) I(i, x) \right] \text{ where,} \qquad (6)$$

$$p\left(x | Tm_i^j, T\sum_i^j T^t\right) = \frac{1}{(2\pi)^{n/2} |T\sum_i^j T^t|^{1/2}} \times e^{-\frac{1}{2}(x-Tm_i^j)^t (T\sum_i^j T^t)^{-1}(x-Tm_i^j)} \qquad (7)$$

and I(i, x) equals 1 if x is assigned to class i, and 0 otherwise. Restricting to diagonal covariances:

$$p\left(x | Tm_i^j, diag\left(T\sum_i^j T^t\right)\right) = \qquad (8)$$

$$\frac{1}{(2\pi)^{n/2} |diag(T\sum_i^j T^t)|^{1/2}} \times e^{-\frac{1}{2}(x-Tm_i^j)^t diag(T\sum_i^j T^t)^{-1}(x-Tm_i^j)}$$

Let $M_{d,T}^j$, represent the models with their covariances restricted to the diagonal, then:

$$\log P(X_T | M_{d,T}^j) = \sum_{x \in X_T} \log \left[ \sum_{i=0}^{N-1} \frac{1}{(2\pi)^{n/2} |diag(T\sum_i^j T^t)|^{1/2}} \times \right. \qquad (9)$$

$$\left. e^{-\frac{1}{2}(x-Tm_i^j)^t diag(T\sum_i^j T^t)^{-1}(x-Tm_i^j)} I(i, x) \right]$$

It can be shown (see, e.g., the above-referenced R. A. Gopinath article) that the MLLT transform T which maximizes the value of $P(X_T | M_{d,T}^j)$ when the model parameters are chosen to be the Maximum likelihood parameters given X transforms the original feature space to one where the diagonal assumption causes the least loss in likelihood. Note that the full covariances are required from the original space, but the important point is that data from all components is used to estimate this transform. Thus, though some individual components may have poor covariance estimates, the transformation still applies.

The discriminant functions are now parameterized by a PSMLT transformation in addition to the component parameters. Taking into account that the tails of Gaussians die out quickly and in order to increase efficiency, the actual function used is:

$$\log P(X_{T^j} \mid M_{d,T^j}^j) = \sum_{x \in X_{T^j}} \log \frac{1}{(2\pi)^{n/2} \left| diag\left(T^j \sum_{C_{M^j(x)}}^{J} T^j\right) \right|^{1/2}} \times$$

$$\exp\left[-\frac{1}{2}\left(x - T^j m_{C_{M^j(x)}}^j\right)^t \times diag\left(T^j \sum_{C_{M^j(x)}}^{J} T^j\right)^{-1} \times \left(x - T^j m_{C_{M^j(x)}}^j\right)\right]$$

(10)

where $C_{M^j}(x_i): R^n \mapsto [1, \ldots, N-1]$ indicates the component of the global model $M^j$ that contributes the most to the likelihood of vector $x_i$. It can be interpreted as the output of a likelihood based vector quantizer with codebook $M^j$. The same is done when computing transformed discriminant function 2, described below.

(ii) Transformed Discriminant Function 2

In accordance with the invention, we define a second discriminant function based on measures of transformation matrix similarity. When using this method, the initial K-means adaptation is removed, and so, in training, $M^j=M$, $\forall j$. Thus, in this case, each speaker is characterized solely by the PSMLT matrix $T^j$ determined as above. Then, given test data X, $T_{test}$ is computed in a manner identical to that in the training phase. As one example, define an intermediate variable $C=TT_{test}^{-1}$, where $T_{test}^{-1}$ represents an inverse of the test data transformation and T represents the training data transformation of the jth enrolled speaker. We want to determine how close C is to the matrix or, in other words, how close $T_{test}$ is to T. At this point, any suitable test which determines this may be applied. For example, a function of the eigenvalues of C may be employed to determine this closeness.

III. Illustrative Embodiments

Illustrative embodiments will now be explained for the transformed discriminant function 1 scenario (section II(i)) and the transformed discriminant function 2 scenario (section II(ii)). FIGS. 1, 2, 3A and 3B correspond to the transformed discriminant function 1 scenario and FIGS. 4, 5, 6A and 6B correspond to the transformed discriminant function 2 scenario.

In the transformed discriminant function 1 scenario, the models for PSMLT systems are again built in two steps. The first step gives $M^j$. In the second step of the training phase, a transformation $T^j$ is obtained for each speaker j by performing the optimization described above in subsection II(i). Subsequently, the number 10 may be used for each j. For the PSMLT system, the voice prints are given by $M^j$ and $T^j$. An illustrative embodiment for implementing this methodology will now be explained.

Referring initially to FIG. 1, a block diagram is shown of an illustrative speaker recognition system for adapting a background acoustic model, assumed to have seen previously generated, and for generating training data matrices in accordance with the invention. The system 10, in a training mode, comprises front-end processing components including a speech utterance pre-processor 12 and a feature extractor 14. The system also comprises a model estimation module 16, an adapted background model store 18, a transformation estimation module 20 and a transformation training data store 22. The speaker recognition system uses training data to adapt the background model and generate training data matrices, as will be explained, which are used during real-time speaker recognition operations.

The speech utterance pre-processor 12 receives training speech and generates representative speech waveforms, i.e., a speech signal. The speech utterance pre-processor 12 may include, for example, an audio-to-analog transducer (microphone) and an analog-to-digital converter which respectively transduce the utterances into an electrical signal and then convert the electrical signal into a digital signal representative of the speech uttered. Further, the pre-processor may sample the speech signal and partition the signal into overlapping frames so that each frame is discretely processed by the remainder of the system. The output signal of the pre-processor 12 is the sampled speech waveforms or speech signal which is recorded and provided to a feature extractor 14.

The feature extractor 14 receives the speech signal and, as is known in the art, extracts cepstral features from the signal at regular intervals, for example, about every 10 milliseconds. The cepstral features are in the form of feature vectors (signals) which are then passed on to the model estimation module 16 and the transformation estimation module.

In the model estimation module 16, the feature vectors are used to adapt the background model M, also provided to the module 16. Adaptation is preferably accomplished as explained above in section I(ii) via a K-means process. However, other suitable processes may be used. The output of module 16 is the adapted background model $M^j$. The adapted background model is then stored in model store 18.

In the transformation estimation module 20, the feature vectors representing the training data and the adapted background model M, provided thereto from module 16, are used to generate the transformed training data matrix for the speaker providing the training speech. The transformed training data matrix is formed according to the description after equation (9) above. The matrix is stored in the data store 22. Thus, for each speaker j providing speech to system 10 during a training phase, an adapted background model $M^j$ and a transformation matrix $T^j$ is generated and represents the speaker's voice print.

Referring now to FIG. 2, the speaker recognition system is depicted in a real-time recognition mode in accordance with the invention. The system 30 comprises front-end processing components including the speech utterance pre-processor 12 and the feature extractor 14, the adapted background model store 18 and the transformation training data store 22. These are the same components of the system mentioned above in the training mode. Additionally, the system comprises a speaker recognition engine 24.

The front-end processing components performs similar operations as mentioned above except, in this case, it is on test speech provided by a user, for example, speech data associated with a telephony application. Feature vectors associated with the test speech are output by the feature extractor 14 and provided to the speaker recognition engine 24.

The engine 24 then computes scores for model j in the following manner. The engine first retrieves the transformation matrix and the adapted model for speaker j from the stores 18 and 22, respectively. Then, the engine 24 computes the score according to equation (10) above. The highest score indicates the enrolled voice print closest to the person providing the test speech. Depending on what type of recognition is being performed, e.g., identify, verify, classify, a recognition output is generated. For example, the previous example shows what would be done for identification, however, verification can also be implemented with the same scores based on a threshold comparison.

Figure 3B:
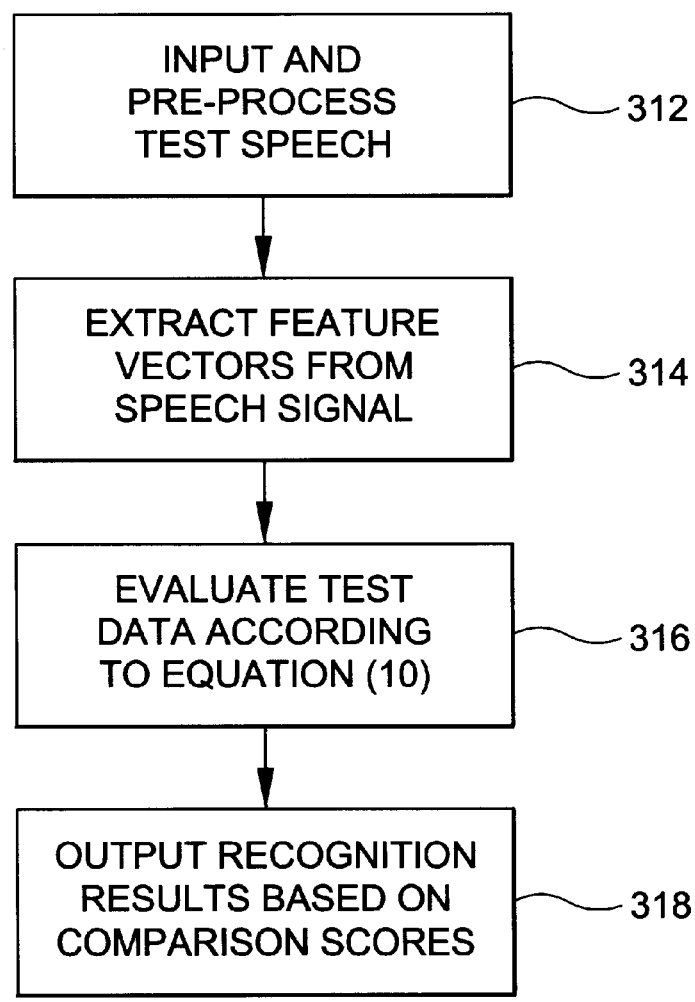

FIGS. 3A and 3B are flow charts summarily illustrating the above processes. In the training mode, a speaker recognition system according to the invention inputs and pre-processes training speech received from an enrolling speaker j to generate a speech signal (step 302). In step 304, feature vectors are extracted from the training speech signal. In step 306, a background model M is adapted using the feature vectors to generate an adapted model $M^j$. Then, in step 308, a training data transformation (matrix) $T^j$ is generated for the speaker using the adapted model and the training feature vectors, as explained in detail above. The voice print of each enrolling speaker (represented by $M^j$ and $T^j$) is stored, in step 310. In a real-time mode, a speaker recognition system according to the invention inputs and pre-processes test speech received from a speaker j to generate a speech signal (step 312). In step 314, feature vectors are extracted from the test speech signal. In step 316, the test data (i.e., feature vectors extracted in step 314) is then evaluated in accordance with equation (10), as described above with regard to speaker recognition engine 24. Lastly, in step 318, the system outputs recognition results based on the scores associated with the evaluation operation.

Figure 4:
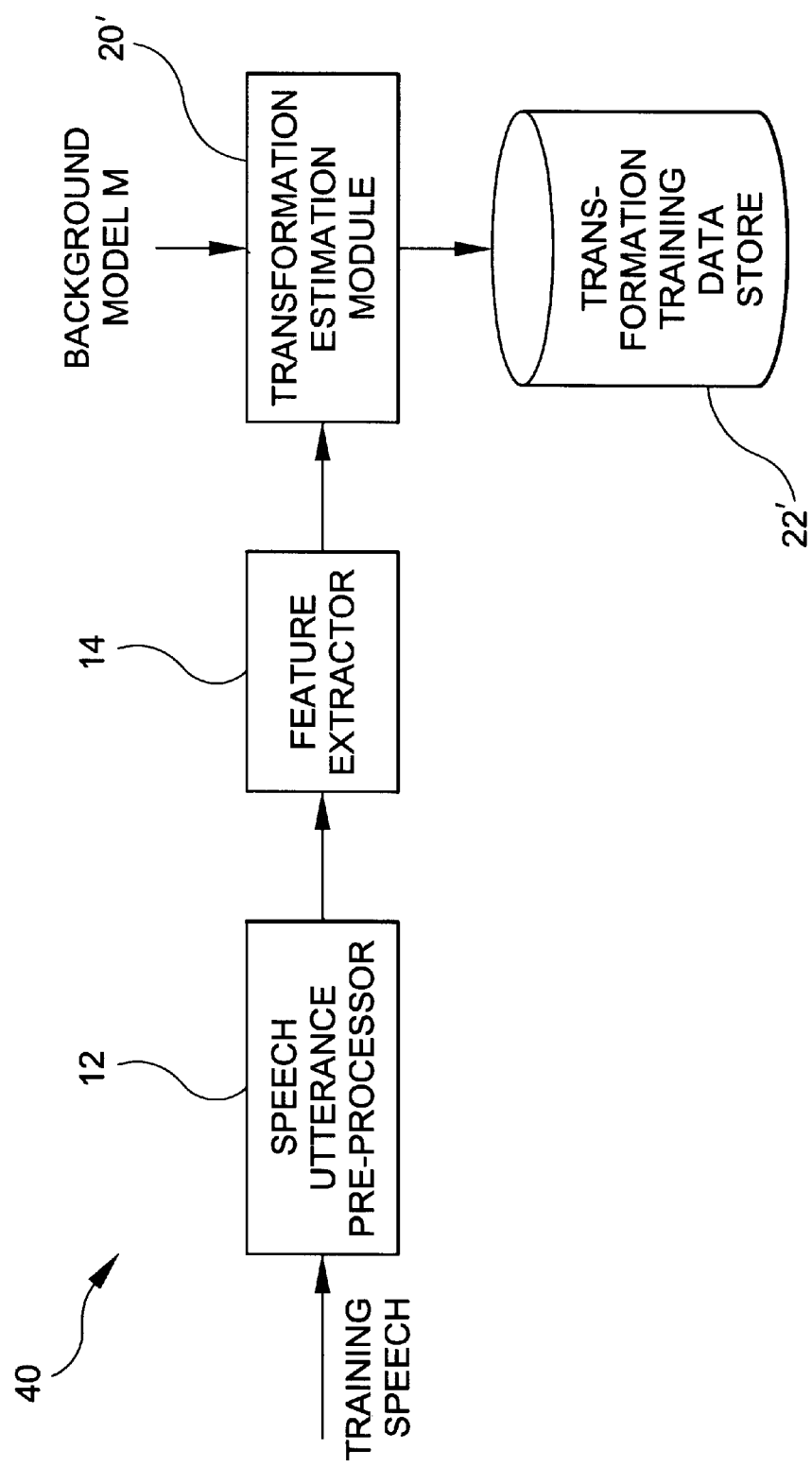
FIG. 4 is a block diagram of an illustrative speaker recognition system in a training mode according to another embodiment of the present invention.
Figure 5:
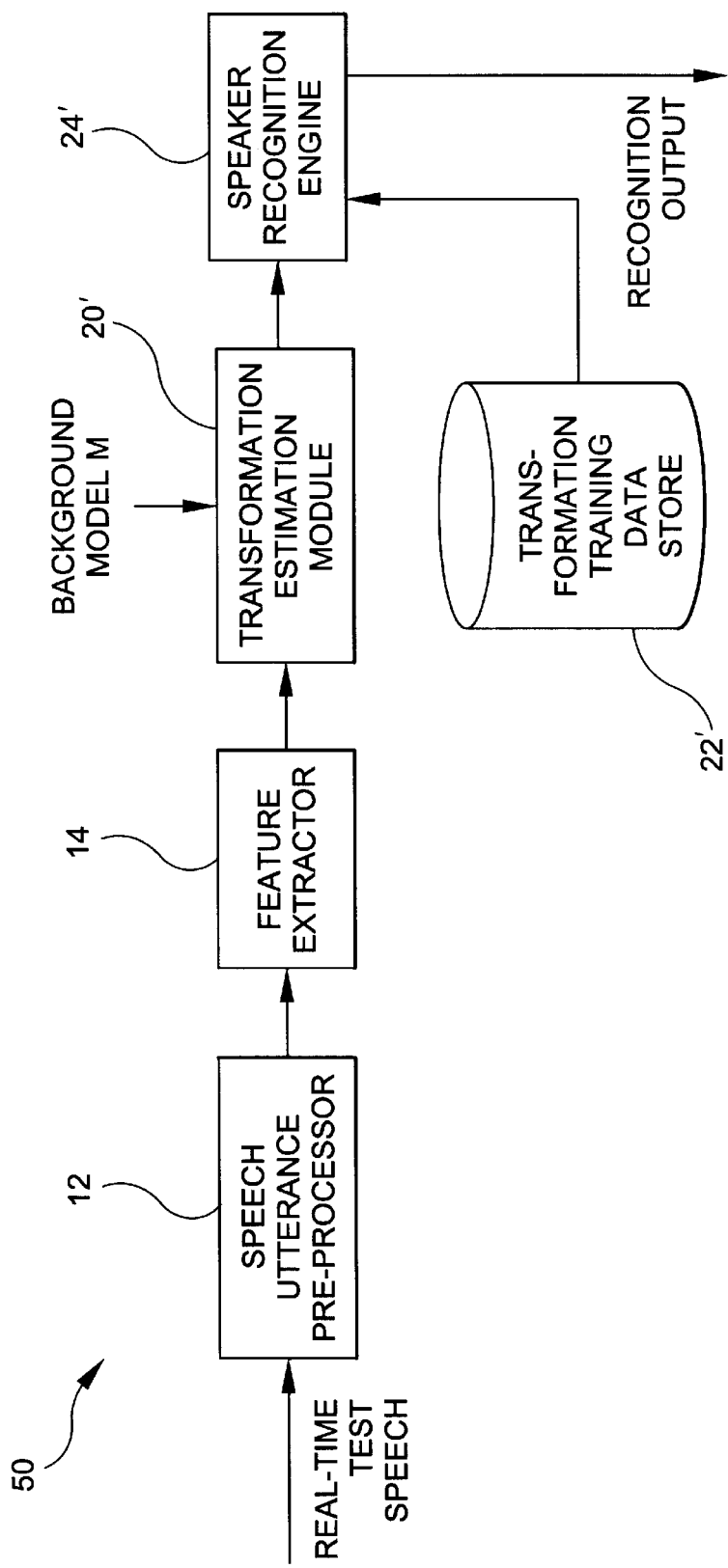
FIG. 5 is a block diagram of an illustrative speaker recognition system in a real-time recognition mode according to another embodiment of the present invention.

Referring now to FIGS. 4, 5, 6A and 6B, the transformed discriminant function 2 scenario is illustrated. The embodiments illustrated in these figures are similar to those described above with the important exception that the transformations are generated with an unadapted background model, rather than with an enrolled speaker-adapted background model. Thus, the components illustrated in the training mode system 40 and the real-time mode system 50, having the same reference numerals as in those shown in FIGS. 1 and 2, therefore have the same function. As shown in FIG. 3, in the training mode, the transformation estimation module 20' generates the transformation for the training data using only the background model M. The transformations are stored in data store 22'. Likewise, as shown in FIG. 4, in the real-time mode, the transformation estimation module 20' generates the transformation for the test data using only the background model M. The test data transformations are then compared to the training data transformations, retrieved from data store 22', in the manner described above in section II(ii), to generate a recognition output.

Figure 6A:
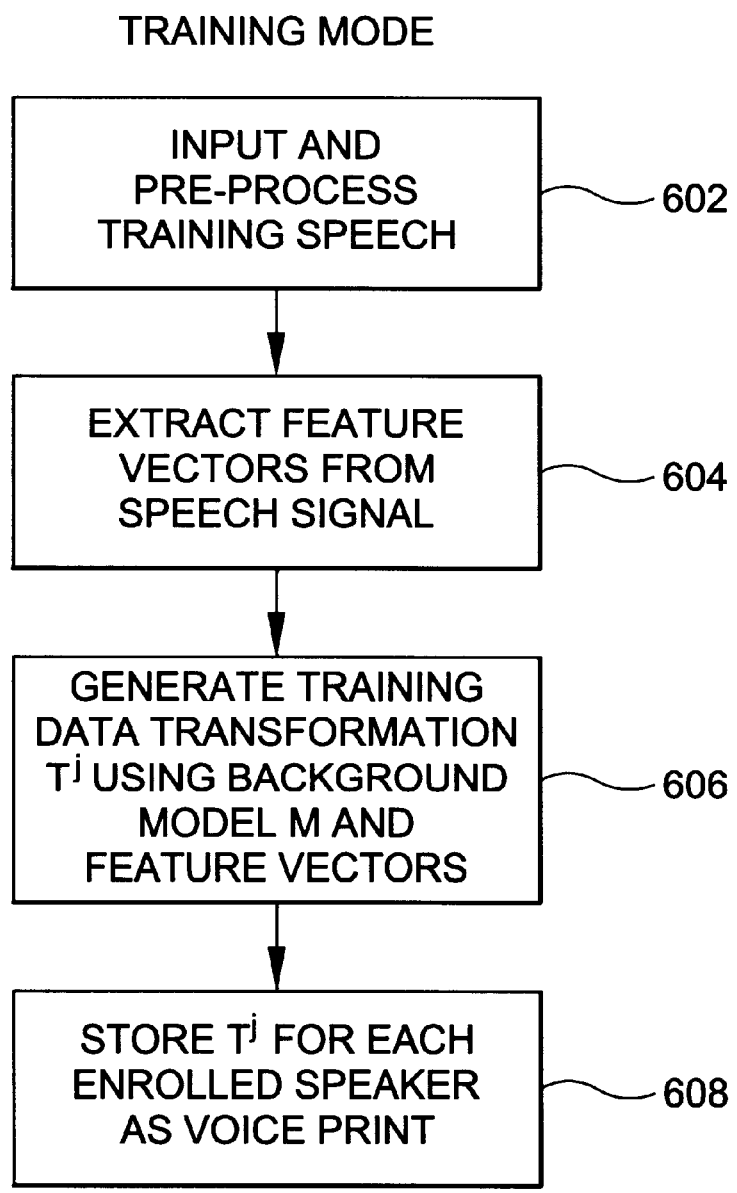
FIGS. 6A and 6B are flow diagrams of an illustrative pattern-specific maximum likelihood transformation based adaptation methodology according to another embodiment of the present invention.
Figure 6B:
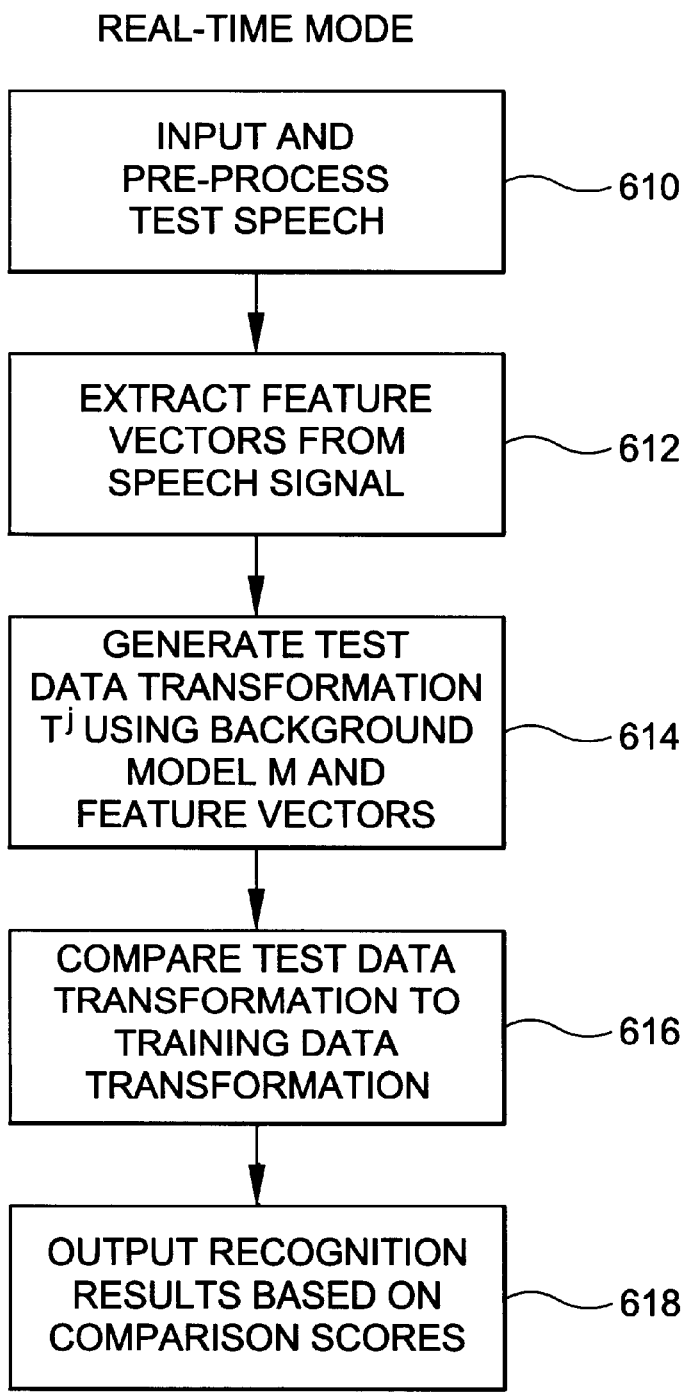

FIGS. 6A and 6B are flow charts summarily illustrating the above processes. It is to be appreciated that the steps of these flow charts are similar to the flow charts of FIGS. 3A and 3B, again, with the important exception that the transformations are generated with an unadapted background model, rather than with an enrolled speaker-adapted background model. Thus, in the training mode, a speaker recognition system according to the invention inputs and pre-processes training speech received from an enrolling speaker j to generate a speech signal (step 602). In step 604, feature vectors are extracted from the training speech signal. In step 606, a training data transformation (matrix) $T^j$ is generated for the speaker using an unadapted background model and the training feature vectors, as explained in detail above. The voice print of each enrolling speaker (represented by $T^j$) is stored, in step 608. In a real-time mode, a speaker recognition system according to the invention inputs and pre-processes test speech received from a speaker j to generate a speech signal (step 610). In step 612, feature vectors are extracted from the test speech signal. In step 614, a test data transformation (matrix) $T^j$ is generated for the speaker using the unadapted background model and the test feature vectors, as explained in detail above. A comparison of the test data transformation and the training data transformations is performed in step 616. Lastly, in step 618, the system outputs recognition results based on the scores associated with the comparison operation.

Figure 7:
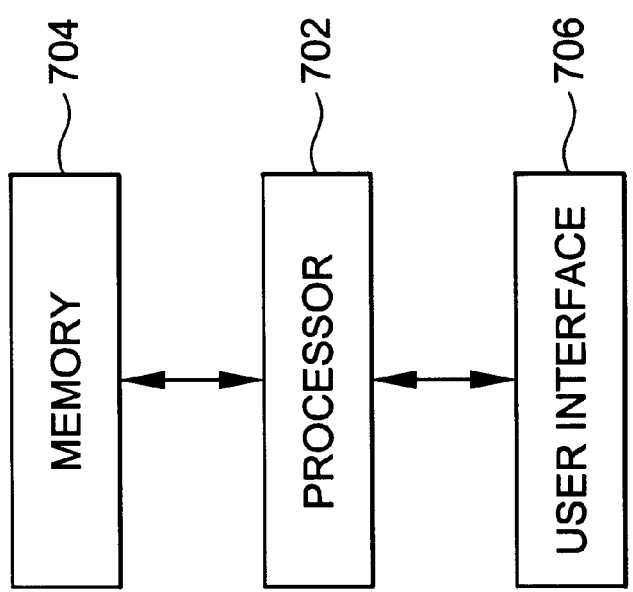
FIG. 7 is a block diagram of an illustrative hardware implementation of a speaker recognition system in a training mode or a real-time recognition mode according to one embodiment of the present invention.

Referring now to FIG. 7, a block diagram of an illustrative hardware implementation of a speaker recognition system employing PSMLT according to the invention (e.g., as illustrated in FIGS. 1, 2, 4 and 5) is shown. In this particular implementation, a processor 702 for controlling and performing training, model and transformation estimation and data comparison (matching) is coupled to a memory 704 and a user interface 706. It is to be appreciated that the term "processor" as used herein is intended to include any processing device, such as, for example, one that includes a CPU (central processing unit) or other suitable processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. The user interface 706 may also include a portion of the speech utterance pre-processor 12 (FIGS. 1, 2, 4 and 5 ) such as the microphone for receiving user speech.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIGS. 1, 2, 4 and 5 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

IV. Sample Experimental Results

In accordance with FIGS. 8–13, we present results mainly in the speaker verification framework, however, we also mention some results for identification. The goal is to illustrate the usefulness of the PSMLT in situations where there is limited training data, which leads directly to poor covariance estimates for a number of components of the adapted global model, as in practical speaker recognition systems, where enrollment often does not provide complete phonetic coverage. By finding the best diagonal space for each speaker, we are able to leverage good covariance estimates to adapt components with poor estimates.

For the experiments described herein, the K-means procedure, as described above in section I(ii), was used to give the baseline speaker models. This is a rudimentary form of adaptation. We have run experiments where instead of adapting a global model, LBG (Linde-Buzo-Gray) clustering was performed on the training data for each speaker. The methods provided herein, however, have demonstrated more stability. At this point, a speaker recognition system, i.e., the baseline system, could be defined in terms of the preceding measure of fit, given in equation (2).

(i) Verification System

Given speech data and an identity claim, in this case the index of the source, a verification system must judge whether or not the data was produced by the specified source. Thes system used for these experiments was based on a likelihood ratio test, using the above discriminant functions of the invention. The normalization score was computed on the global model, which was trained over a large population of background speakers. Results for verification are presented in the form of ROC curves which show the trade-off in false acceptance of a claim versus the false rejection of a claim. In essence, corresponding to each point on the curve is a threshold, which when used in the ratio test gives performance as indicated by the coordinates.

The Lincoln Lab Handset Database (LLHDB) was used for the matched condition experiments described in this section. 20 speakers (10 male, 10 female) were enrolled, and another 20 were used as imposters. The rest of the speakers were used, in conjunction with speakers from other telephony data sets, as part of a large collection of speakers representing the background model. Note that while the tests are matched, the data used to construct the background model came from all of the telephony microphones in the database, as well as from other data sets. All 10 of the TIMIT-text sentences (in the LLHDB) were used for the tests, giving a total of 200 target trials. Each imposter (different from any of the targets) can pretend to be one of the other speakers. 7.5, 15, and approximately 30 second sections of the rainbow passage recordings (LLHDB) were used for target training. 64 Gaussian components per model based on 19 dimensional cepstra plus the delta parameters were used for the 30 and 15 second cases, whereas 16 components were used for the 7.5 second case. We compare the systems, baseline versus the PSMLT system.

Figure 8:
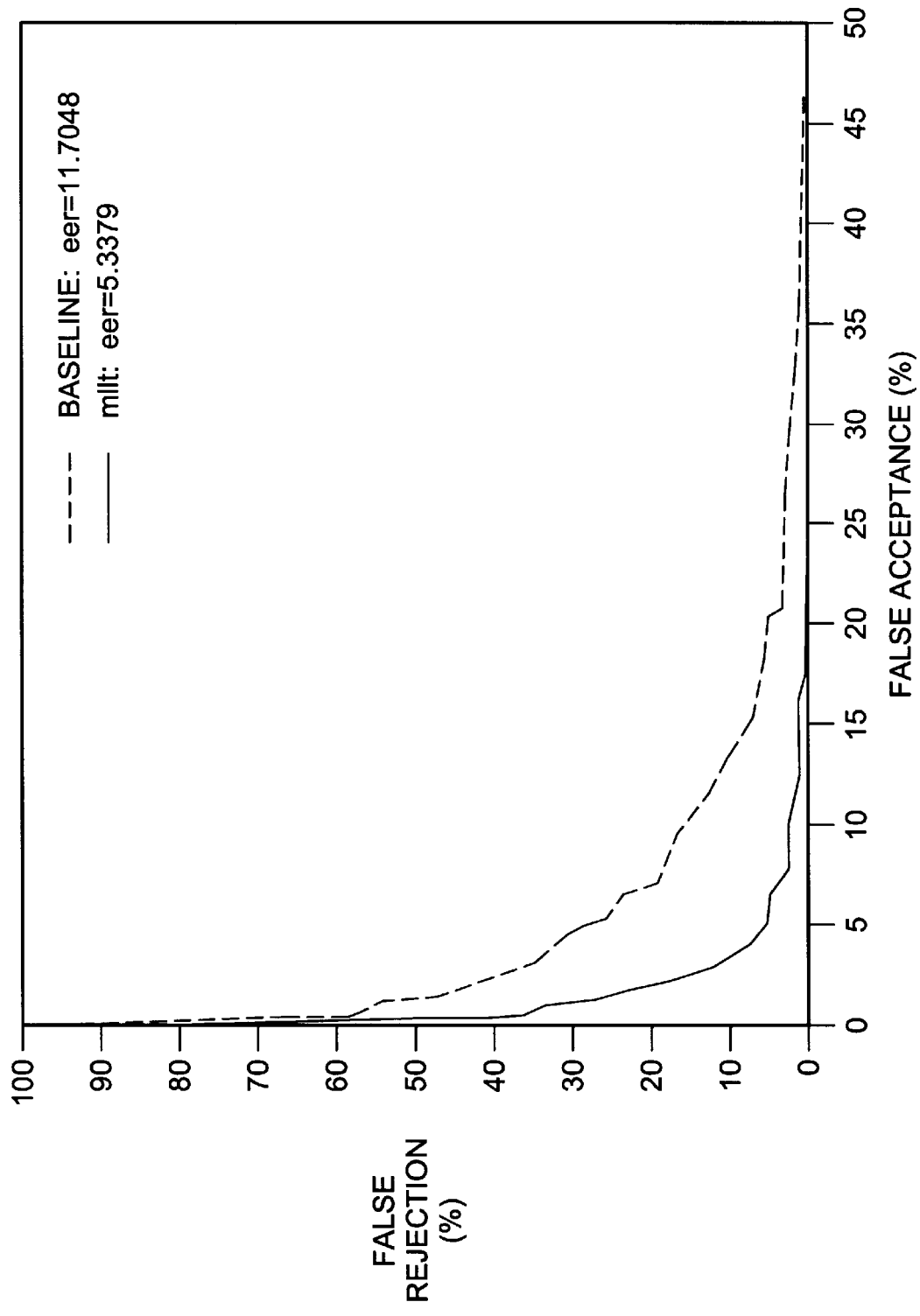
Figure 9:
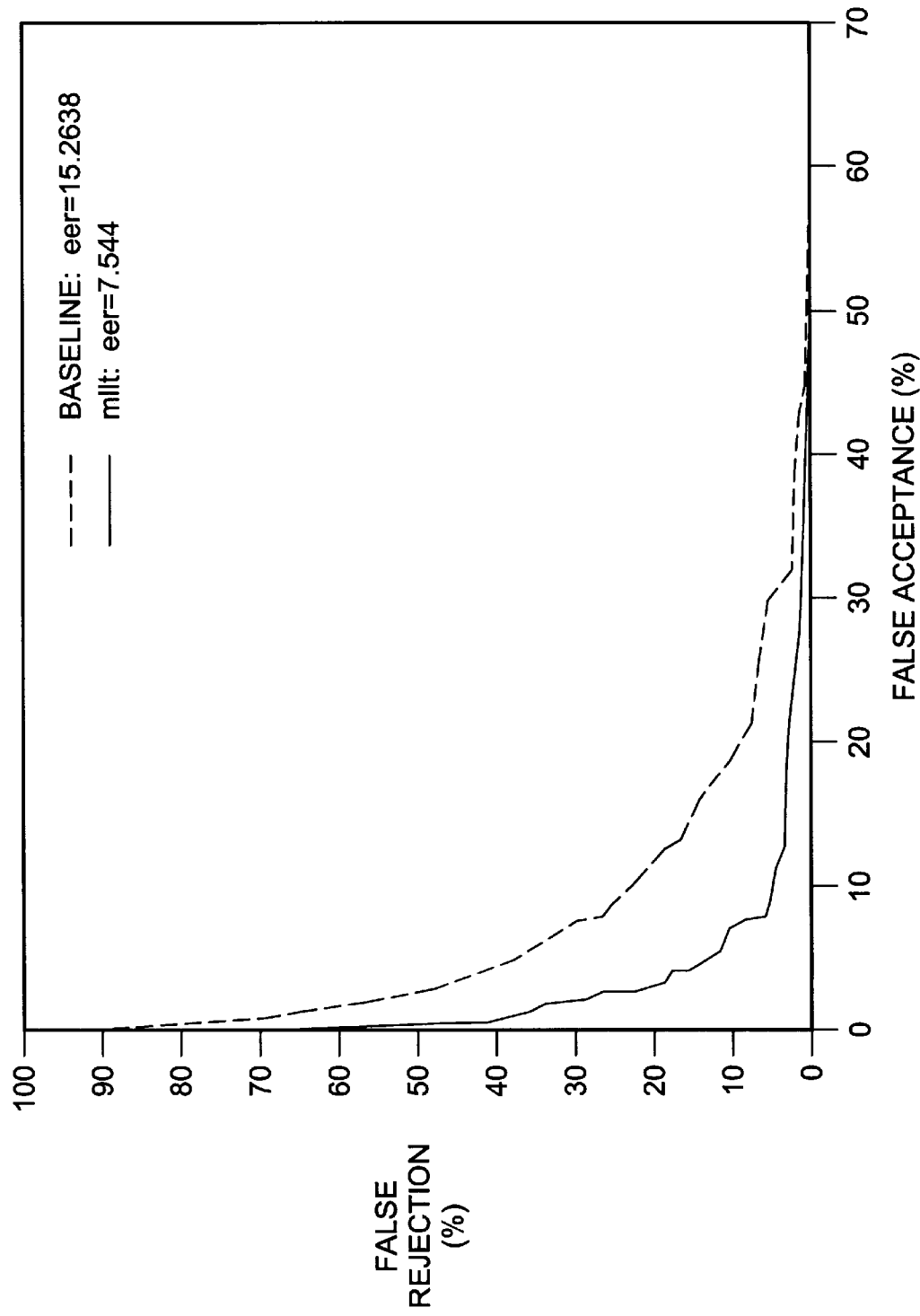
Figure 10:
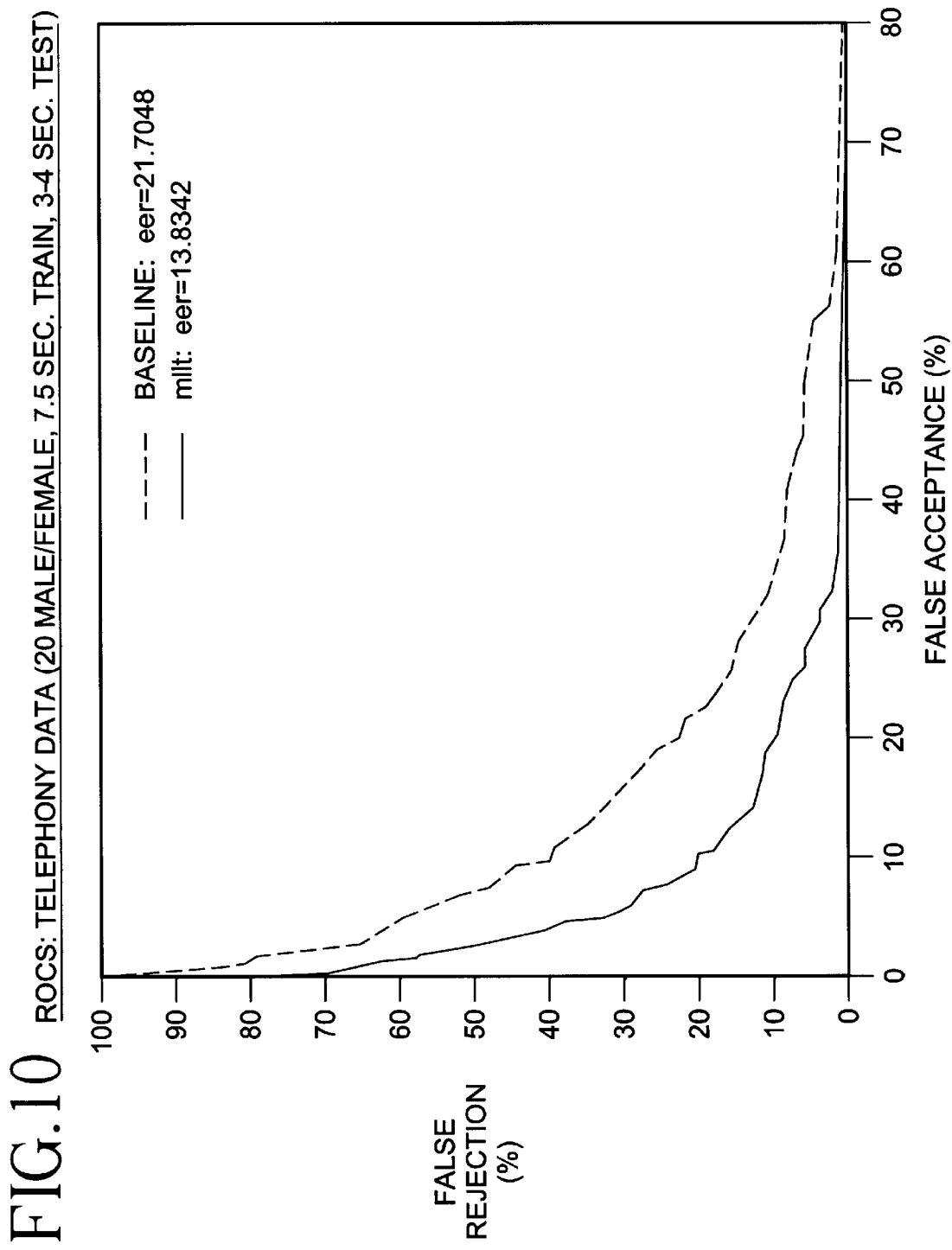

Specifically, FIGS. 8 and 13 illustrate results associated with the 30 second passage, wherein dashed trade-off (false acceptance of a claim versus the false rejection of a claim) curve in FIG. 8 corresponds to the baseline system, which uses expectation maximization (EM), and the solid trade-off curve corresponds to the PSMLT system. Note that in the graphs, the use of PSMLT is indicated by 'milt.' FIG. 13 illustrates the comparison of the identification error rates for male and female speakers with respect to the baseline and the PSMLT (transform). FIGS. 9 and 12 and FIGS. 10 and 11 illustrate similar results for the 15 second and 7.5 second passages, respectively.

The results show that the PSMLT system is a tremendous improvement over the baseline system. In fact, note that the equal error rate (eer) for the transform based system with 15 seconds of training is better than the baseline performance with approximately 30 seconds of training. The same holds when comparing the 7.5 and 15 second cases, though we note that the number of components is different. We propose that the lack of training data is compensated for by the global nature of the transform and its ability to be estimated from sparse data.

(ii) Identification System

The method of speaker identification is as follows. For the baseline case: Given test data X, compute the efficient version of discriminant function 2 for each j, and let the decision be given by arg $\max_j$ log $P(X|M_d{}^j)$. Recall that the subscript d denotes diagonal models.

For the PSMLT case: During the training phase, a transformation $T^j$ is obtained for each speaker j. Given test data X, compute the quantity 10 for each j, and let the decision be given by arg $\max_j$ log $P(X|M_{d,T}{}^j)$. We present results on the same target and test data as in the verification experiments in FIGS. 11, 12 and 13. Note the same trends: the transform based performance for the most part is comparable to baseline performance with twice the amount of training data.

Accordingly, the present invention provides a method of speaker characterization to handle the case of phonetic mismatch between training and test data. Practical applications often require that data collection for training be on-line and short. Consequently, the phonetic content of possible test speech may not be well characterized, giving poor performance. The problem can be restated in terms of the mathematical speaker models, which are based on Gaussian mixtures. With limited training data, the global model cannot be properly characterized in the sense that the covariance structure around each of the global model components cannot be properly estimated. The method of speaker characterization according to the invention, described above, allows using the good covariance estimates to adapt all of the components. We have given results to illustrate that as we reduce the training data, thus reducing the phonetic coverage, the performance using the PSMLT is consistently better than when using EM.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in recognizing a provider of an input pattern-based signal, the method comprising the steps of:
   extracting one or more feature vectors from an input pattern-based signal of an enrolling provider, the input pattern-based signal representing training data provided by the provider;
   adapting a background model using the one or more training feature vectors; and
   generating a training data transformation using the adapted model and the one or more training feature vectors, the training data transformation and the adapted model comprising a pattern-specific representation of the enrolling provider of the input pattern-based signal.

2. The method of claim 1, wherein the training data transformation is a maximum likelihood linear transformation.

3. The method of claim 1, wherein the training data transformation is unimodular.

4. The method of claim 1, wherein the training data transformation is applied to the adapted model to generate a pattern-specific transformed model.

5. The method of claim 4, wherein the pattern-specific transformed model is restricted to diagonal covariances.

6. The method of claim 1, wherein the background model is adapted via a K-means procedure.

7. The method of claim 1, further comprising the step of performing the training feature vector extraction, background model adaptation and training data transformation generation for one or more other enrolling providers of input pattern-based signals.

8. The method of claim 7, further comprising the steps of:
   extracting one or more feature vectors from an input pattern-based signal provided by a real-time provider, the input pattern-based signal representing test data provided by the provider;
   computing scores for the one or more test feature vectors based on the respective training data transformations and adapted background models of at least a portion of the enrolled providers; and
   obtaining a recognition result based on the computed scores.

9. The method of claim 8, wherein a score for an enrolled model j is represented by:

$$\log P(X_{T^j} \mid M^j_{d,T^j}) = \sum_{x \in X_{T^j}} \log \frac{1}{(2\pi)^{n/2} \left| diag\left(T^j \sum_{C_{M^{j(x)}}}^{j} T^j\right) \right|^{1/2}} \times$$

$$\exp\left[-\frac{1}{2}\left(x - T^j m^j_{C_{M^{j(x)}}}\right)^t \times diag\left(T^j \sum_{C_{M^{j(x)}}}^{j} T^j\right)^{-1} \times \left(x - T^j m^j_{C_{M^{j(x)}}}\right)\right]$$

where $X_T$ represents the test data, $T^j$ represents the transformation, $M^j_{d,T^j}$ represents the adapted background model with the transformation applied thereto, and where $C_{M^j}(x_i)$ represents the component of the adapted background model $M^j$ that contributes the most to the likelihood of vector $x_i$.

10. The method of claim 1, wherein the input pattern-based signal is representative of speech and the pattern recognition system is a speaker recognition system.

11. The method of claim 10, wherein the speaker recognition system operates in one of a text-dependent mode and a text-independent mode.

12. The method of claim 1, wherein the training data transformation is generated without needing to employ a recognition engine.

13. A method for use in recognizing a provider of an input pattern-based signal, the method comprising the steps of:
   extracting one or more feature vectors from an input pattern-based signal of an enrolling provider, the input pattern-based signal representing training data provided by the provider; and
   generating a training data transformation using an unadapted model and the one or more training feature vectors, the training data transformation comprising a pattern-specific representation of the enrolling provider of the input pattern-based signal.

14. The method of claim 13, wherein the training data transformation is a maximum likelihood linear transformation.

15. The method of claim 13, wherein the training data transformation is unimodular.

16. The method of claim 13, further comprising the step of performing the training feature vector extraction and training data transformation generation for one or more other enrolling providers of input pattern-based signals.

17. The method of claim 16, further comprising the steps of:
   extracting one or more feature vectors from an input pattern-based signal provided by a real-time provider, the input pattern-based signal representing test data provided by the provider;
   generating a test data transformation using an unadapted model and the one or more test feature vectors, the test data transformation comprising a pattern-specific representation of the real-time provider of the input pattern-based signal;
   computing scores for the one or more test feature vectors by comparing the test data transformation with the respective training data transformations of at least a portion of the enrolled providers; and
   obtaining a recognition result based on the computed scores.

18. The method of claim 17, wherein a score for an enrolled model j is computed by determining a degree of closeness between the test data transformation and the training data transformation the of the jth enrolled provider.

19. The method of claim 18, wherein the degree of closeness is computed by:
   defining an intermediate variable C equivalent to $TT_{test}^{-1}$, where $T_{test}^{-1}$ represents an inverse of the test data transformation and T represents the training data transformation of the jth enrolled provider; and
   considering a function of eigenvalues associated with the intermediate variable C.

20. The method of claim 13, wherein the input pattern-based signal is representative of speech and the pattern recognition system is a speaker recognition system.

21. The method of claim 20, wherein the speaker recognition system operates in one of a text-dependent mode and a text-independent mode.

22. The method of claim 13, wherein the training data transformation is generated without needing to employ a recognition engine.

23. A method for use in recognizing a provider of an input pattern-based signal, the method comprising the steps of:
   extracting one or more feature vectors from an input pattern-based signal provided by a real-time provider, the input pattern-based signal representing test data provided by the provider;
   computing scores for the one or more test feature vectors based on respective training data transformations and adapted background models of at least a portion of enrolled providers; and
   obtaining a recognition result based on the computed scores;
   wherein each training data transformation and adapted background model for an enrolled provider is previously provided by extracting one or more feature vectors from an input pattern-based signal of the given provider, the input pattern-based signal representing training data provided by the given provider, adapting a background model using the one or more training feature vectors, and generating the training data transformation using the adapted model and the one or more training feature vectors, the training data transformation and the adapted model comprising a pattern-specific representation of the given provider of the input pattern-based signal.

24. A method for use in recognizing a provider of an input pattern-based signal, the method comprising the steps of:
   extracting one or more feature vectors from an input pattern-based signal provided by a real-time provider, the input pattern-based signal representing test data provided by the provider;
   generating a test data transformation using an unadapted model and the one or more test feature vectors, the test data transformation comprising a pattern-specific representation of the real-time provider of the input pattern-based signal;

computing scores for the one or more test feature vectors by comparing the test data transformation with respective training data transformations of at least a portion of enrolled providers; and obtaining a recognition result based on the computed scores;

wherein each training data transformation for an enrolled provider is previously provided by extracting one or more feature vectors from an input pattern-based signal of the given provider, the input pattern-based signal representing training data provided by the given provider, and generating the training data transformation using an unadapted model and the one or more training feature vectors, the training data transformation comprising a pattern-specific representation of the given provider of the input pattern-based signal.

25. Apparatus for use in recognizing a provider of an input pattern-based signal, the apparatus comprising:

at least one processor operative to: (i) extract one or more feature vectors from an input pattern-based signal of an enrolling provider, the input pattern-based signal representing training data provided by the provider; (ii) adapt a background model using the one or more training feature vectors; and (iii) generate a training data transformation using the adapted model and the one or more training feature vectors, the training data transformation and the adapted model comprising a pattern-specific representation of the enrolling provider of the input pattern-based signal.

26. The apparatus of claim 25, wherein the training data transformation is a maximum likelihood linear transformation.

27. The apparatus of claim 25, wherein the training data transformation is unimodular.

28. The apparatus of claim 25, wherein the training data transformation is applied to the adapted model to generate a pattern-specific transformed model.

29. The apparatus of claim 28, wherein the pattern-specific transformed model is restricted to diagonal covariances.

30. The apparatus of claim 25, wherein the background model is adapted via a K-means procedure.

31. The apparatus of claim 25, wherein the at least one processor is further operative to perform the training feature vector extraction, background model adaptation and training data transformation generation for one or more other enrolling providers of input pattern-based signals.

32. The apparatus of claim 31, wherein the at least one processor is further operative to: (i) extract one or more feature vectors from an input pattern-based signal provided by a real-time provider, the input pattern-based signal representing test data provided by the provider; (ii) compute scores for the one or more test feature vectors based on the respective training data transformations and adapted background models of at least a portion of the enrolled providers; and (iii) obtain a recognition result based on the computed scores.

33. The apparatus of claim 32, wherein a score for an enrolled model j is represented by:

$$\log P(X_{T^j} | M_{d,T^j}^j) = \sum_{x \in X_{T^j}} \log \frac{1}{(2\pi)^{n/2} \left| diag\left(T^j \sum_{C_{M^j(x)}}^{j} T^j\right) \right|^{1/2}} \times$$

$$\exp\left[-\frac{1}{2}(x - T^j m_{C_{M^j(x)}}^j)^t \times diag\left(T^j \sum_{C_{M^j(x)}}^{J} T^j\right)^{-1} \times (x - T^j m_{C_{M^j(x)}}^j)\right]$$

where $X_T$ represents the test data, $T^j$ represents the transformation, $M_{d,T^j}^j$ represents the adapted background model with the transformation applied thereto, and where $C_{M^j}(x_i)$ represents the component of the adapted background model $M^j$ that contributes the most to the likelihood of vector $x_i$.

34. The apparatus of claim 25, wherein the input pattern-based signal is representative of speech and the pattern recognition system is a speaker recognition system.

35. The apparatus of claim 34, wherein the speaker recognition system operates in one of a text-dependent mode and a text-independent mode.

36. Apparatus for use in recognizing a provider of an input pattern-based signal, the apparatus comprising:

at least one processor operative to: (i) extract one or more feature vectors from an input pattern-based signal of an enrolling provider, the input pattern-based signal representing training data provided by the provider; and (ii) generate a training data transformation using an unadapted model and the one or more training feature vectors, the training data transformation comprising a pattern-specific representation of the enrolling provider of the input pattern-based signal.

37. The apparatus of claim 36, wherein the training data transformation is a maximum likelihood linear transformation.

38. The apparatus of claim 36, wherein the training data transformation is unimodular.

39. The apparatus of claim 36, wherein the at least one processor is further operative to perform the training feature vector extraction and training data transformation generation for one or more other enrolling providers of input pattern-based signals.

40. The apparatus of claim 39, wherein the at least one processor is further operative to: (i) extract one or more feature vectors from an input pattern-based signal provided by a real-time provider, the input pattern-based signal representing test data provided by the provider; (ii) generate a test data transformation using an unadapted model and the one or more test feature vectors, the test data transformation comprising a pattern-specific representation of the real-time provider of the input pattern-based signal; (iii) compute scores for the one or more test feature vectors by comparing the test data transformation with the respective training data transformations of at least a portion of the enrolled providers; and (iv) obtain a recognition result based on the computed scores.

41. The apparatus of claim 40, wherein a score for an enrolled model j is computed by determining a degree of closeness between the test data transformation and the training data transformation the of the jth enrolled provider.

42. The apparatus of claim 41, wherein the degree of closeness is computed by: (i) defining an intermediate variable C equivalent to $TT_{test}^{-1}$, where $T_{test}^{-1}$, represents an inverse of the test data transformation and T represents the training data transformation of the jth enrolled provider; and (ii) considering a function of eigenvalues associated with the intermediate variable C.

43. The apparatus of claim 36, wherein the input pattern-based signal is representative of speech and the pattern recognition system is a speaker recognition system.

44. The apparatus of claim 43, wherein the speaker recognition system operates in one of a text-dependent mode and a text-independent mode.

45. Apparatus for use in recognizing a provider of an input pattern-based signal, the apparatus comprising:

at least one processor operative to: (i) extract one or more feature vectors from an input pattern-based signal provided by a real-time provider, the input pattern-based signal representing test data provided by the provider; (ii) compute scores for the one or more test feature vectors based on respective training data transformations and adapted background models of at least a portion of enrolled providers; and (iii) obtain a recognition result based on the computed scores; wherein each training data transformation and adapted background model for an enrolled provider is previously provided by extracting one or more feature vectors from an input pattern-based signal of the given provider, the input pattern-based signal representing training data provided by the given provider, adapting a background model using the one or more training feature vectors, and generating the training data transformation using the adapted model and the one or more training feature vectors, the training data transformation and the adapted model comprising a pattern-specific representation of the given provider of the input pattern-based signal.

46. Apparatus for use in recognizing a provider of an input pattern-based signal, the apparatus comprising:

at least one processor operative to: (i) extract one or more feature vectors from an input pattern-based signal provided by a real-time provider, the input pattern-based signal representing test data provided by the provider; (ii) generate a test data transformation using an unadapted model and the one or more test feature vectors, the test data transformation comprising a pattern-specific representation of the real-time provider of the input pattern-based signal; (iii) compute scores for the one or more test feature vectors by comparing the test data transformation with respective training data transformations of at least a portion of enrolled providers; and (iv) obtain a recognition result based on the computed scores; wherein each training data transformation for an enrolled provider is previously provided by extracting one or more feature vectors from an input pattern-based signal of the given provider, the input pattern-based signal representing training data provided by the given provider, and generating the training data transformation using an unadapted model and the one or more training feature vectors, the training data transformation comprising a pattern-specific representation of the given provider of the input pattern-based signal.

47. An article of manufacture for use in recognizing a provider of an input pattern-based signal, comprising a machine readable medium containing one or more programs which when executed implement the steps of:

extracting one or more feature vectors from an input pattern-based signal provided by a real-time provider, the input pattern-based signal representing test data provided by the provider;

computing scores for the one or more test feature vectors based on respective training data transformations and adapted background models of at least a portion of enrolled providers; and obtaining a recognition result based on the computed scores;

wherein each training data transformation and adapted background model for an enrolled provider is previously provided by extracting one or more feature vectors from an input pattern-based signal of the given provider, the input pattern-based signal representing training data provided by the given provider, adapting a background model using the one or more training feature vectors, and generating the training data transformation using the adapted model and the one or more training feature vectors, the training data transformation and the adapted model comprising a pattern-specific representation of the given provider of the input pattern-based signal.

48. An article of manufacture for use in recognizing a provider of an input pattern-based signal, comprising a machine readable medium containing one or more programs which when executed implement the steps of:

extracting one or more feature vectors from an input pattern-based signal provided by a real-time provider, the input pattern-based signal representing test data provided by the provider;

generating a test data transformation using an unadapted model and the one or more test feature vectors, the test data transformation comprising a pattern-specific representation of the real-time provider of the input pattern-based signal;

computing scores for the one or more test feature vectors by comparing the test data transformation with respective training data transformations of at least a portion of enrolled providers; and obtaining a recognition result based on the computed scores;

wherein each training data transformation for an enrolled provider is previously provided by extracting one or more feature vectors from an input pattern-based signal of the given provider, the input pattern-based signal representing training data provided by the given provider, and generating the training data transformation using an unadapted model and the one or more training feature vectors, the training data transformation comprising a pattern-specific representation of the given provider of the input pattern-based signal.

* * * * *

UNITED STATES PATENT AND TRADEMARK OFFICE
CERTIFICATE OF CORRECTION

PATENT NO. : 6,751,590 B1
DATED : June 15, 2004
INVENTOR(S) : U.V. Chaudhari et al.

Page 1 of 1

It is certified that error appears in the above-identified patent and that said Letters Patent is hereby corrected as shown below:

Column 6,
Line 15, delete
$$" p\left(x \mid Tm_i^j, T\sum_i^j T^t\right) = \frac{1}{(2\pi)^{n/2}\left|T\sum_i^j T^t\right|^{1/2}} \times e^{-\frac{1}{2}(x-Tm_i^j)'(T\sum_j^i T^t)^{-1}(x-Tm_i^j)} "$$

and insert
$$" p\left(x \mid Tm_i^j, T\Sigma_i^j T^t\right) = \frac{1}{(2\pi)^{n/2}\left|T\Sigma_i^j T^t\right|^{1/2}} \times e^{-\frac{1}{2}(x-Tm_i^j)'(T\Sigma_i^j T^t)^{-1}(x-Tm_i^j)} ".$$

Column 7,
Line 1, delete
$$" \log P(X_{T^j} \mid M_{d,T^j}^j) = \sum_{x \in X_{T^j}} \log \frac{1}{(2\pi)^{n/2}\left|diag\left(T^j \sum_{C_{M^j(x)}}^j T^j\right)\right|^{1/2}} \times \exp\left[-\frac{1}{2}(x-T^j m_{C_{M^j(x)}}^j)' \times diag\left(T^j \sum_{C_{M^j(x)}}^j T^j\right)^{-1} \times (x-T^j m_{C_{M^j(x)}}^j)\right] "$$

and insert
$$" \log P\left(X_{T^j} \mid M_{d,T^j}^j\right) = \sum_{x \in X_{T^j}} \log \frac{1}{(2\pi)^{n/2}\left|diag\left(T^j \sum_{C_{M^j(x)}}^j T^j\right)\right|^{1/2}} \times \exp\left[-\frac{1}{2}(x-T^j m_{C_{M^j(x)}}^j)' \times diag\left(T^j \sum_{C_{M^j(x)}}^j T^j\right)^{-1} \times (x-T^j m_{C_{M^j(x)}}^j)\right] "$$

Signed and Sealed this

Thirty-first Day of August, 2004

JON W. DUDAS
*Director of the United States Patent and Trademark Office*